(12) United States Patent
Mathew et al.

(10) Patent No.: US 11,119,753 B2
(45) Date of Patent: Sep. 14, 2021

(54) DISTRIBUTED AUTONOMOUS PATCHING SYSTEM

(71) Applicant: PayPal, Inc., San Jose, CA (US)

(72) Inventors: Suresh Mathew, San Jose, CA (US); Arvind Sugumar, San Jose, CA (US); Krishnakanth Batta, San Jose, CA (US); Vaibhav Desai, San Jose, CA (US); Benjamin Thomas, San Jose, CA (US); Ramakrishnan Sumesh Vadassery, San Jose, CA (US); Shankar Jothi, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/732,268

(22) Filed: Dec. 31, 2019

(65) Prior Publication Data

US 2020/0356355 A1 Nov. 12, 2020

Related U.S. Application Data

(60) Provisional application No. 62/844,083, filed on May 6, 2019.

(51) Int. Cl.
*G06F 8/65* (2018.01)
(52) U.S. Cl.
CPC ...................................... *G06F 8/65* (2013.01)
(58) Field of Classification Search
USPC ........................................................ 717/169
See application file for complete search history.

(56) References Cited

U.S. PATENT DOCUMENTS

| | | | | |
|---|---|---|---|---|
| 7,765,538 B2* | 7/2010 | Zweifel | ..................... | G06F 8/71 717/168 |
| 8,019,534 B2* | 9/2011 | Jung | ...................... | G01C 21/36 701/426 |
| 10,776,097 B2* | 9/2020 | U | ............................ | H04L 67/10 |
| 2011/0321031 A1* | 12/2011 | Dournov | ................... | G06F 8/65 717/171 |
| 2012/0331455 A1* | 12/2012 | Ayachitula | ................ | G06F 8/65 717/171 |
| 2017/0351868 A1* | 12/2017 | Jacob | ..................... | G06F 21/602 |
| 2018/0248750 A1* | 8/2018 | Johnston | ................... | G06F 8/65 |
| 2019/0227786 A1* | 7/2019 | Price | .......................... | G06F 8/65 |
| 2020/0249928 A1* | 8/2020 | Zeng | ........................ | G06F 8/658 |
| 2021/0019135 A1* | 1/2021 | Hwang | .................. | G06F 9/4881 |

* cited by examiner

*Primary Examiner* — Wei Y Zhen
*Assistant Examiner* — Clint Thatcher
(74) *Attorney, Agent, or Firm* — Haynes and Boone, LLP

(57) ABSTRACT

There are provided systems and methods for a distributed autonomous patching system. During patching of a cloud computing architecture, an autonomous patching system may operator autonomously with no to minimal operator input to patch the host machines and corresponding computes of the cloud computing architecture's available applications. This may work by receiving a patch and determining corresponding patching factors for an availability zone of computes in the cloud. The system may then determine a patching topology map having an order of patching nodes for the selected computes of the application in the availability zone. Thereafter, while monitoring those computes, the system may select certain computes into an active processing funnel, where the patch is applied to those computes. Fingerprinting of before and after-patch states may be used to ensure proper patching.

20 Claims, 7 Drawing Sheets

DISTRIBUTED AUTONOMOUS PATCHING SYSTEM

CROSS-REFERENCE TO RELATED APPLICATIONS

This application claims the benefit of and priority to U.S. Provisional Patent Application No. 62/844,083 filed May 6, 2019 and entitled "DISTRIBUTED AUTONOMOUS PATCHING SYSTEM," which is incorporated herein by reference in its entirety.

TECHNICAL FIELD

The present application generally relates to autonomous patching of cloud computing systems, and more specifically to utilizing a patching architecture to roll-out patches on software of distributed cloud computing machines.

BACKGROUND

Various types of service providers may utilize or implement cloud computing architectures that provide a system of remote devices and servers to provide data processing and computer system resources. There are primarily two types of computers in a cloud architecture—hypervisors (host machines) and virtual machines (guest machines). Cloud computing infrastructure for various types of cloud computing architectures require a high level of security, and specifically, the software implementations run by the machines of the architecture. Software run by these machines and hosts include the operating system ("OS"), control plane software components, and guest tenants (operating system and software). This security may include the security "of" the cloud (i.e., including host OS and control plane software components), and security "in" the cloud (i.e., guest OS and guest software components). To maintain a high level of security, continuous patching may be required to prevent or resolve any exploits or security threats by malicious parties and bad actors. Previous automated patching systems are operator driven, where an administrator or other operator drives, triggers, monitors, and controls the patching operations. However, these automated patching systems may take considerable time to efficiently and securely roll-out a patch to all of the cloud's machines and hosts. Thus, a solution for securing the operating systems with consistency, reliability and speed is required.

Figure 1:
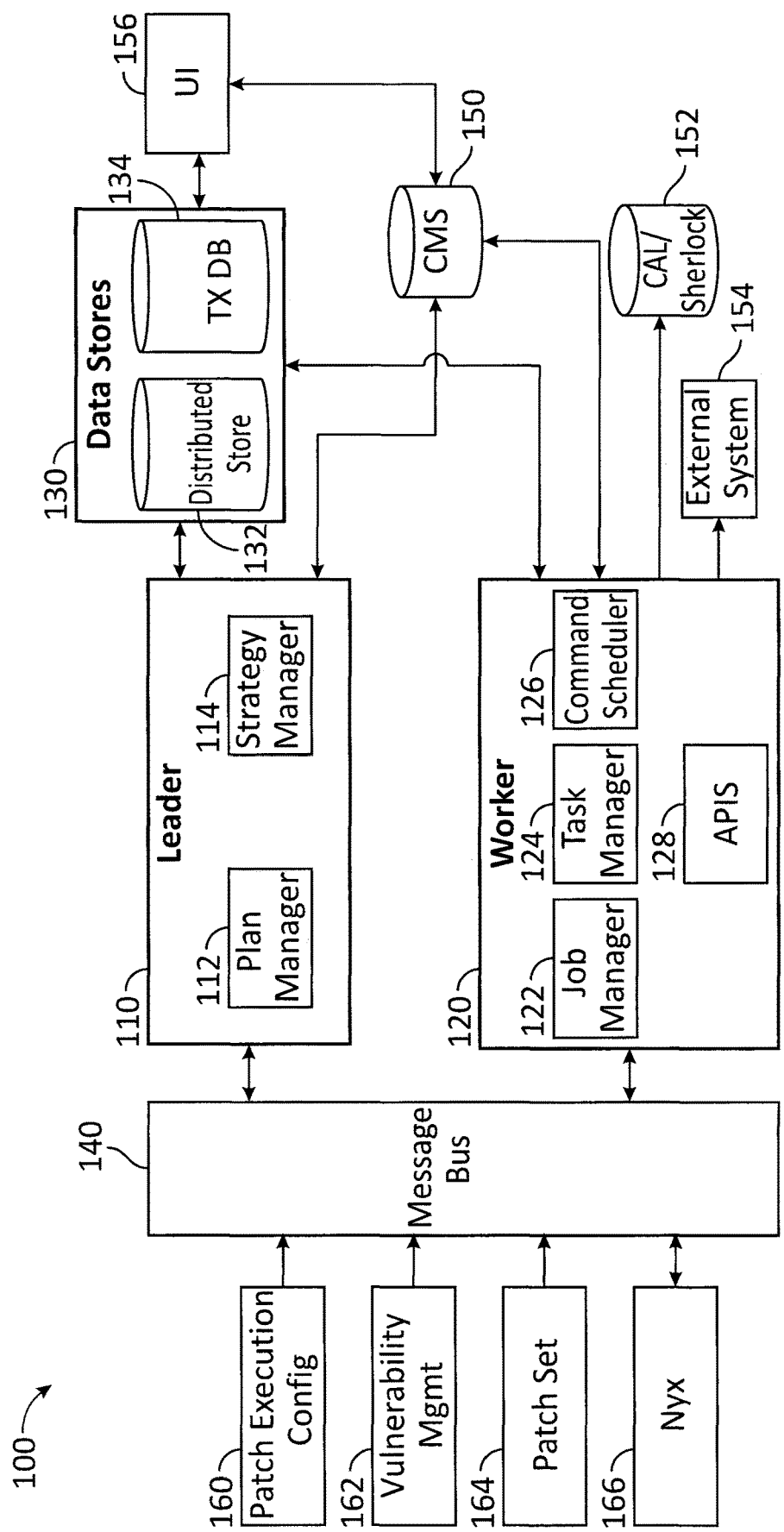
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a distributed autonomous patching system. Systems suitable for practicing methods of the present disclosure are also provided.

A cloud computing system and architecture may be made up of many hosts, such as machines, that are assigned to perform data processing tasks and provide computing resources to users, service providers, or other entities that are utilizing that specific cloud. A compute of the cloud computing system may correspond to one, or a set, of host/virtual machines that operate an application for the cloud architecture (e.g., an application that provides some services or computer resources to those entities utilizing the cloud, including operating systems (OSs) and the like). Thus, computes for a patch may be referred to as machines or hosts with the cloud that provide specific applications and data processing to those entities utilizing the cloud. Hosts or machines may therefore provide applications to users that may be utilized for various computer resources and processing. Applications run by these computes may require patching due to security issues, such as known vulnerabilities, threats, or exploits that may endanger the cloud, data protection and/or privacy in the cloud, and/or availability of cloud resources. Computes of one or more machines may therefore require patching to resolve or address any potential threat to the cloud.

Available computes of the cloud computing architecture may be organized into "availability zones" (AZs) or availability sets. An AZ corresponds to a geographic area of cloud computing resources that are available for use and thus serve a specific population (e.g., entities that may utilize the cloud for computing resources). For example, the US might have several availability zones in different locations (locations that have one or more data centers) that serve specific clients and/or geographic zones for public or company cloud computing. Thus, these AZs may correspond to the locations of the data centers available to the public. Businesses, users, and other entities may select specific AZs based on their host machines, compliance, proximity or locality, applications, or other considerations. Resources (e.g., computes) may be moved between AZs by administrators in order to provide functionality to users of the cloud. Moreover, cloud resources may be distributed to entities over multiple AZs.

An AZ may be required to patch the computes of the AZ in order to provide security to those computes, such as to a group of machines working on the same application. In order to do this, a patching leader operation, process, or application may be responsible for initialization, workload distribution and work plan assignment of patching worker operations, processes, or application. Moreover, the leader may be required to perform strategy management for execution and coordination of a patching plan. For example, the leader may include a strategy manager process or operation where the strategy manager provides a safe execution strategy of the patch strategy and roll-out plan. This may be based on safety requirements for the cloud, as well as required aggressiveness levels for the patch roll-out (e.g., how fast the patch needs to be delivered and updates on the computes, how many computes may be taken offline to patch, requirements and/or traffic for processing data and providing resources for the computes, whether the computes can remain online or are required to remain online during patching, and the like). For example, the strategy manager may determine a strategy that includes the percentage of machines within an availability zone that can be taken out of traffic at a point, as well as the execution sequence or "topology map" that determines the nodes or compute(s) that may be operated on to patch in a specific sequence (e.g., based on which machines are available to take offline, serve traffic, importance of machine to patch, etc.).

For example, the strategy manager may first receive input for patching operations. This may include the patch to be distributed and used to patch the machines and computes of the cloud computing architecture. The input may also include roll-out and patching requirements, such as an urgency needed to patch to the machines (e.g., a security threat level, rating, or other factor), a patching order for machines, a number or percentage of machines that may be taken offline for a particular AZ, set of AZs, or the cloud, or other input from a patching operator or manager user. Thus, this "patch set" includes patch definition and target kernel state for the machine using the AZ. The patch set further includes patch execution configuration (such as safety and aggressiveness levels for patching of the machines in an AZ), which are the only inputs required for patching. Thereafter the system and patching act in autonomous fashion to distribute patches among host machines and other computes in AZs of a cloud architecture.

The strategy manager may further access, determine, or receive additional data for the particular AZs and/or cloud. For example, the leader operation may monitor or track data for AZs that may include input strategies, host and application health, traffic health and vulnerability of the host machines or computes, and other data for the AZ or cloud. A topology map may then be generated using this data, which includes processing nodes made of one or more computes, which follow an organized plan or order to process the computes of the AZ. Processing nodes in an application and AZ combination therefore follows a topological processing on the created structure to identify and execute the patch and other actions on the computes. Nodes thus are picked and processed with the patch based on the strategy and size of the active processing funnel.

The patching leader process may further include a plan manager operation that is responsible to perform workload distribution to patching worker processes, which may include assigning a safe work plan to each worker based on the determined topology map and machine availability to take offline. For example, the plan manager may be responsible for initial workload distribution of the leader with the workers. The plan manager initializes configurations and target sets for the workers, which is based on the determined strategy (including the topology map and the number of hosts to take offline and/or patch at a time). Once the leader has determined the strategy and the workers to operate on the hosts, the leader may then distribute the workload details for all workers. Distribution may be done using a workload distribution algorithm, such as one designed to operate on opinionated platform as a service (PaaS) systems. Workload distribution further makes use of an optimized Distributed Topological Processing algorithm and Concurrent Hashing to operate safely on the computes, application, and AZ.

When determining distribution by the leader, the distribution algorithm may utilize parameters, such as application grouping (e.g., compute groups in the AZ), the AZ itself, availability of a specific compute to serve traffic (e.g., provide processing or computer resources, which may affect taking the compute offline to patch), and a current transaction count per second served by the compute (e.g., how many data processing operations or transactions are occurring per some time period, such as how busy the compute is).

After workload distribution, the patching worker operation may then be responsible to execute the jobs assigned by splitting them into tasks, reporting progress to the leader via a message bus, and coordinating job execution with the computes and workers, such as retries and workflow advancement through the determined strategy. The worker may be in communication with one or more other resources to perform the patching based on the patching strategy. For example, the worker may rely on signals and data from site management tools and site monitoring tools. Since the leader and worker form an autonomous system, the leader and worker may utilize a message bus for interaction between components and external system executions. This message bus is kept at a high degree or percentage of availability for the leader and worker so that the system may operate in a resilient manner if there is an issue in one of the worker or leader components. Thus, after the strategy is determined by the leader, the worker(s) act on the computes within the AZ and application to reach the target state for the patch of the application. This target state is defined by the patch set that acts as input for the particular patch. Further, the patching system, since it is autonomous, uses a distributed and highly available data store to store strategy and plan data utilized by the leader and worker. Granular transaction and execution details (e.g., patch roll-out and machine patching data) are stored in a relational database accessible to the system.

Once the patch strategy details are provided to the worker(s), the strategy and plans that are coordinated may be utilized to generate funnels per application group and availability zone. For example, every application may include an execution funnel for computes in the availability zone that utilize or are associated with the particular application. The funnel functions similar to a kernel funnel for processing operations where the funneling operation for a kernel may prevent unwanted or unnecessary processing threads from being computed. The funnel for the application may therefore include an active portion and an inactive portion, where the active funnel may process one machine or multiple machines depending on the compute group, the funnel, and/or how many nodes in the patching strategy are to be patched at once. Thus, the current compute being worked on will be in the active funnel. The inactive funnel consists of the portion of the funnel where the rest of the machines are awaiting patching and the patching operation/topology/strategy of the worker may then select from those in the inactive funnel to move into the active funnel state and then patch. Thus, those computes that are to be worked and completed are in an inactive funnel waiting to be pushed into the active funnel. The size of the active funnel is decided by parameters such as pool size, machines in traffic, and pool depletion. Computes in the active funnel can be executed with any configured action (Restart, Patch, Reboot etc., depending on the strategy, the patch, and the success of the patching operations).

Thus, as a compute is in the active funnel, it may be patched. When patching a machine, in order to maintain security and verify that the host is properly being patched, a fingerprinting mechanism of the host undergoing the patching operation may be utilized. Fingerprinting may be done during a pre-patch and a post-patch state of the particular host, which verifies that the host is not drifting away from the observed baselines (e.g., before patching) after patch execution. The baselines of the host that may be fingerprinted include a combination of patch node status, load balancer status for the patching operations, and application/host performance metrics before and after the patching. When determining if the patching is successful based on the patching operation, an acceptable deviation may be allowed for host and application performance metrics. However, the patch node, and/or load balancer statuses are expected to match between the pre-patch and the post-patch states of the host. For example, some of the values that may be verified between the fingerprinting states include the CPU, memory and transactions per minute states or statuses of the host or compute before and after the action.

In case of patching, seats in the funnel may be blocked or impeded when patch execution fails at the fingerprinting phase or in the middle of the patching process. If a seat becomes blocked, then the patching system may continue to patch the available seats at a lower speed. In order to unblock the search, the patching system may then, while operating in the background, attempt to unblock the seat by rebooting or replacing the compute that has the error, or may require an administrator to review the funnel and blocked seats. The fingerprinting may be performed using a JavaScript Object Notation (JSON) document structure, which may be used to depict the pre-patch and post-patch fingerprinting states of a host or compute that was patched. Thus, the patching system acts on the AZs and computes in the cloud in a site safe manner to reach the target state, which is defined by the patch set. This configuration is quite different from automated systems where each action or a set of actions is initiated by a patching operator or administrator, where that operator is then responsible to track overall execution using reports and other tracking mechanisms.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a leader 110, a worker 120, data stores 130, and a message bus 140 with other components of the patching system of system 100. Leader 110 and worker 120 may correspond to executable processes, procedures, and/or applications with associated hardware. In other embodiments, system 100 may include additional or different modules having specialized hardware and/or software as required. System 100 may correspond to a patching system having components utilized to roll-out and implement a patch across AZs of a cloud computing architecture. In this regard, a patch and patching strategy may be input to leader 110, which may determine a patching strategy and performing patching of computes in an AZ using worker 120 through message bus 140. Patching data and reports may be stored to data stores 130. System 100 may include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over a network.

System 100 may be maintained, for example, by an online service provider, which may provide cloud services through one or more cloud components, such as host machines and computes of the cloud. In one example, system 100 may be provided by PayPal®, Inc. of San Jose, Calif., USA. However, in other embodiments, system 100 may be maintained by or include another type of service provider, which may provide the aforementioned services to a plurality of users.

In this regard, leader 110 includes a plan manager 112 and a strategy manager 114, which may correspond to operations, processes, and/or applications of leader 110 that may be utilized to prepare worker 120 for implementing a patch throughout a cloud computing architecture, such as on the computes of the cloud computing architecture. In this regard, strategy manager 114 may determine the patch execution and strategy, such as a number of machines that may be taken offline and/or patches at a time (e.g., based on a maximum number, a percentage, and/or a usage rate or percentage of computes in the particular AZ). For example, strategy manager 114 may utilize one or more of an input strategy for the patch, a host machine health for machines in the AZ and/or compute, an application health for the application needed to be patched, a traffic health for the AZ and/or for the computes/machines in the AZ, and a vulnerability for the computes/machines in the AZ based on the patch and/or application. In some embodiments, plan manager 112 may receive data for planning patch strategy using message bus 140, for example, patch executing config 160, vulnerability management 162, and/or patch set 164, which may provide data necessary to determine the patch strategy. Using this data, strategy manager 114 may determine a topology or a mapping of nodes (e.g., groups of computes) that is utilized to proceed through the computes when patching.

Using the strategy having the patch nodes or number of computes and the topology, plan manager 112 may then implement the patch across the AZ using the topology. When initializing worker 120 for patching of the computes, plan manager 112 may use application grouping parameters corresponding the computes, availability zone parameters of the AZ, availability of a compute to serve traffic, and current transaction count per second served by the computes to determine patching workload distribution and distributed topological processing. This may further be determined using a distributed topological processing algorithm and concurrent hashing in order to operate safely on the site. Leader 110 may also communicate with data stores 130, such as a distributed store 132 and a transaction database 134 when determining the patching strategy and further performing workload distribution. Further, a content management system 150 may be in communication with leader 110 regarding the creation and modification of digital content by the cloud and/or particular AZ, which may provide and output content, as well as data from data stores 130 through user interface 156. For example, user interface 156 may be used to show a number of patched machines, which machines are worked on, and other statistics with regard to patching. The user interface may also be used to provide various input, as needed. The processes to determine a patch strategy and distribute to worker 120 is discussed in further detail with regard to FIG. 2.

Once workload distribution is determined, leader 110 may communicate with worker 120 for performing the patching and distributing workload for patching computes within an AZ. For example, worker 120 includes a job manager 122 and a task manager 124, which may manage jobs and tasks required by worker 120. For example, job manager 122 and task manager 124 may issue commands and operations including the patching operations on computes within an active funnel of a patching operation based on a patching topology. When performing the operations with regard to computes within an AZ, command scheduler 126 may be utilized to schedule commands for patching operations, for example, using the strategy (e.g., topological map and group size for compute patching). Worker 120 further may utilize one or more APIs to interface with, send and receive API calls, and other communicate with other systems and applications, including external system 154, for the purpose of performing patching operations and issuing patching commands to one or more computes.

Worker 120 may be in communication with a site management tool, such as Nyx 156 and/or a site monitoring tool, such as CAL/Sherlock 152 through message bus 140 to further receive data and signals necessary for coordinating job execution, including retries of patching applications of computes (e.g., when patch failure or unavailability of the compute) and workflow advancement through the patching topology. Worker 120 may further be in communication with data stores 130, including distributed store 132 and transaction database 134, for accessing and storing data associated with the patching operations, including transaction states and results from patching transactions. Worker 120 may utilize content management system 150 based on the particular content generated by content management system 150, which may be accessed through UI 156. The processes to perform the patching based on the patch strategy and funnel by worker 120 is discussed in further detail with regard to FIG. 3.

Figure 2:
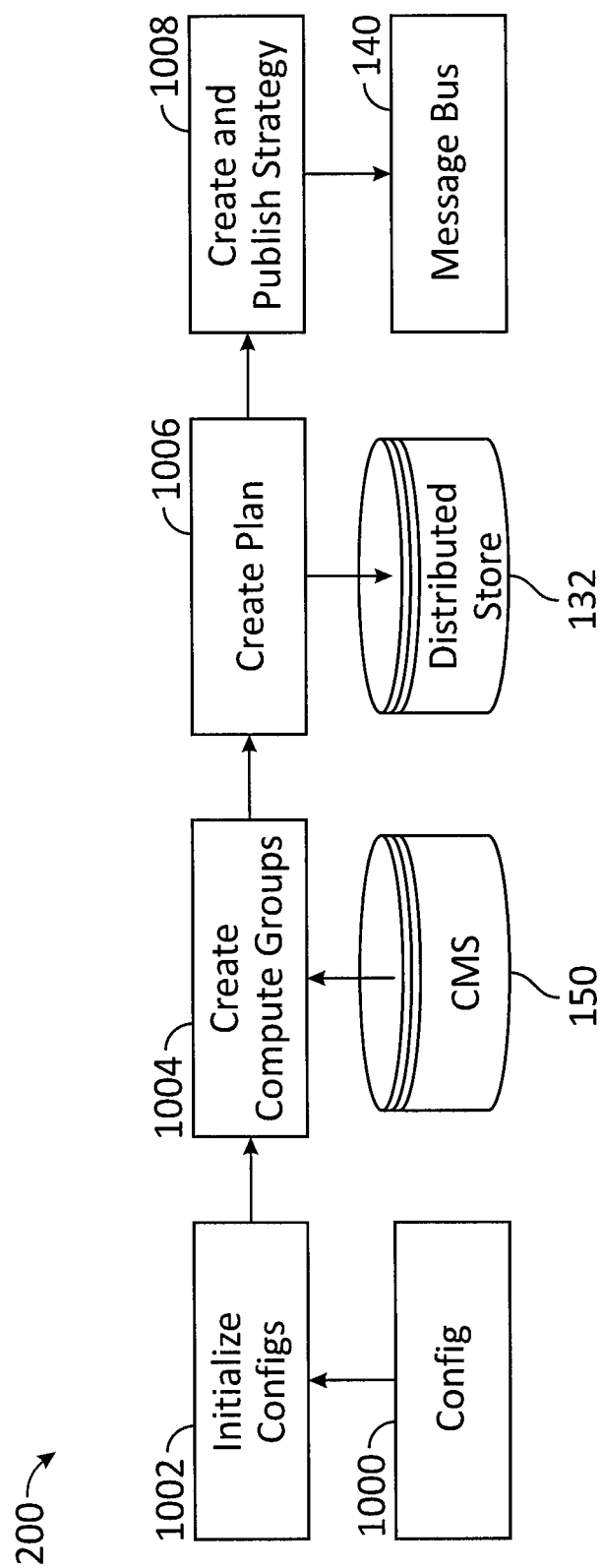
FIG. 2 is an exemplary diagram of a patch leader operation, according to an embodiment.

FIG. 2 is an exemplary diagram of a patch leader operation, according to an embodiment. In this regard, a patch leader, such as leader 110 in system 100, may execute a process 200 to perform planning and initializing of a patching plan that includes at least a patching topology map of patching nodes within an availability zone for patching of computes of the availability zone having an application requiring patching. For example, process 200 may operate on a cloud computing architecture that provides cloud computing services (e.g., computing resources, data processing operations, and the like) through AZs that include the computing resources provided by applications of computes (e.g., machines or hosts of a data center).

In an initial step 1000, a configuration is received and/or accessed by the leader operation, process, or application, where the configuration includes scheduling for the patch and any settings or patch parameters required for the patching of the application provided by the computes from a content store. This configuration of the leader and worker may therefore include the patch definition, target kernel state, and patch execution configurations (e.g., a safety and/or aggressiveness level on patch execution of the patch throughout the cloud architecture). This may correspond to a one-time input that is required to initialize the configuration. Further the configuration may include other data that may be determined by the patch leader and/or system prior to patching. For example, the computes of an AZ may be monitored for usage percentage (e.g., percentage, such as 40% of computes for an application that are being used at a time), those computes being used, traffic, application and/or machine/host health, and vulnerability of the machines/hosts. Once the configuration is determined, at step 1002, the configurations for the leader at initialized, where the values for variable data used by the leader for the patch are determined and defined (e.g., how the leader is to function with regard to the patching operation). This may include setting the target state of the application that is to be patched based on the configurations so that the patch may be used to update the computes with the patch based on a desired target state.

At step 1004, compute groups are created. The compute groups may correspond to machines or hosts for an application that are required to be patched, such as those running or assisting in running a particular application that requires patching. Compute groups may be determined based on the configurations, such as the safety and/or aggressiveness level for patching. The compute groups may therefore be based on the particular AZ, as well as the application to be patched. This may include a number or percentage of machines to be patched at a time, which may later define the active funnel and inactive funnel size (e.g., number of computes) for a patching funnel within a particular AZ and application set. In order to create the compute groups, content management system 150 may be utilized, which may provide data to the leader regarding the application needing patching (e.g., the compute groups serving the application as a resource for the cloud computing architecture). Once the compute groups have been determined, at step 1006, a plan is created for patching. This may correspond to a topological map, flowchart, or other mapping of the compute groups, which includes an order for patching one or more nodes (e.g., compute groups) of machines running or associated with the application requiring patching. For example, the topology of the patching process may include multiple nodes of one or more computes that execute the application and require patching with the patch roll-out. Each node may be processed so that the patch is implemented on those computes. Prior to proceeding to a next node, the computes may be checked (e.g., based on a fingerprint) for success of patching, and therefore the topology defines the strategy and size of the active funnel, whereby nodes are then picked and processed.

After creating the plan, the plan may then be stored to distributed store 132, which may make data available to workers for use in implementing the plan. At step 1008, the strategy (e.g., the topology map and the active node size, such as the number of computes for patching at a node) is created and published to the worker. This may be done by communicating with the worker via message bus 140, which provides messaging between the leader and the worker operations, processes, and/or applications. Further message bus 140 further allows for communication with external inputs and resources, such as those that are necessary to perform patch strategy formation by the leader, as well as those resources that allow for workload distribution and processing by the worker for the patch distribution.

Figure 3:
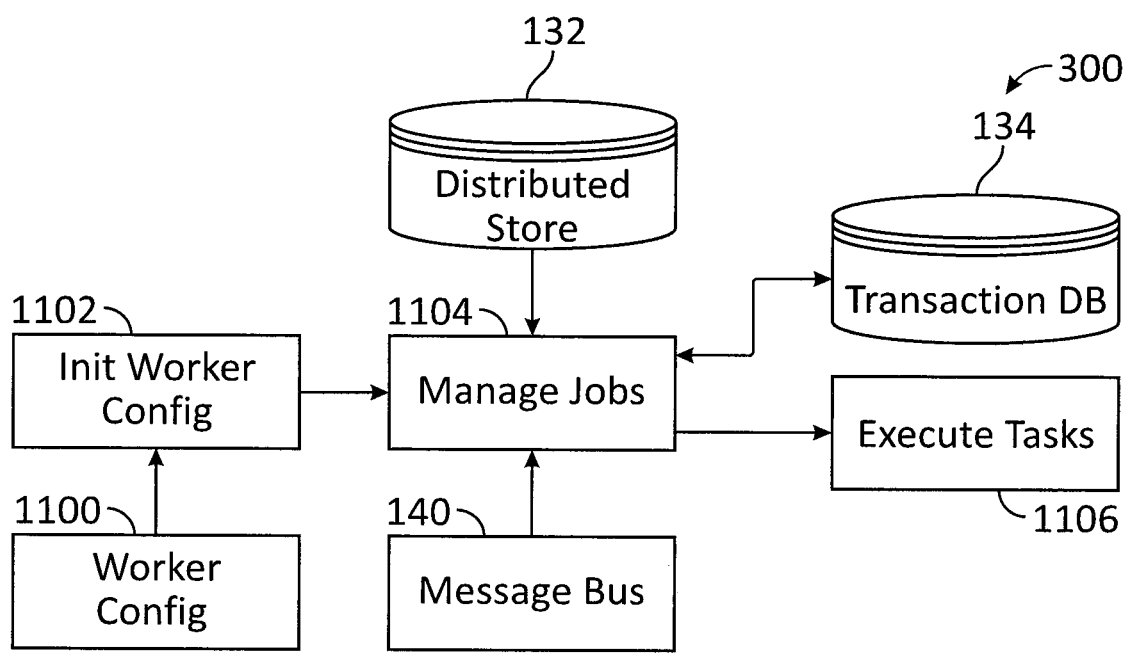
FIG. 3 is an exemplary diagram of a patch worker operation, according to an embodiment.

FIG. 3 is an exemplary diagram of a patch worker operation, according to an embodiment. In this regard, a patch worker, such as worker 120 in system 100, may execute a process 300 to process workload distribution of a workload for patching computes within an availability zone—application pair (e.g., an application requiring patching based on a patch strategy and required patch). For example, process 300 may operate on a cloud computing architecture that provides cloud computing services (e.g., computing resources, data processing operations, and the like) through AZs that include the computing resources provided by applications of computes (e.g., machines or hosts of a data center). Process 300 may be performed based on a determined strategy and compute grounds from process 200 of FIG. 2

At step 1100, worker configuration is determined, which may correspond to the configurations for the worker of the patching system. The configuration of the worker may be based on the particular patch, the application requiring the patch, the compute groups (and corresponding funnel), and/or the patch strategy (e.g., the patch topology map). At step 1102, initialization of the worker configuration occurs, where the initialization may be based on the configurations determined at step 1100. For example, the initialization of the worker may include locating and defining any values necessary for the worker to implement the patch based on the patching strategy across an AZ (e.g., on the computes in the AZ for the application). Initialization of the worker may then allow the worker to perform the particular job that the worker is assigned to, such as the particular patch and patching strategy.

Once the worker is initialized for the patching operation, at step 1104, the patching job may then be managed based on the patching strategy. For example, the worker may receive data from distributed store 132 that is associated with the particular patch and patching strategy. Distributed store 132 may include data for the patching strategy, such as the topology map, compute groups, and/or other data needed to perform the patching based on the patch parameter. Message bus 140 may be used to communicate with one or more other components of the patching system and/or the external patching system. For example, message bus 140 may be used to communicate with the leader regarding the job and patching strategy, as well as receive updates and transmit status of patching. Message bus 140 may also be used to communicate with other resources, including external resources, necessary for workload distribution and/or determination of compute availability, machine or application health, vulnerabilities, traffic, and the like.

At step 1106, tasks are executed for the particular patch strategy, which may correspond to the granular tasks for patching the computes of the AZ. While managing jobs and executing tasks at steps 1104 and 1106, the worker may be in communication with transaction database 134 to report patch successes or failures. For example, as the worker proceeds through a patching strategy and topology map, those processed nodes and patched computes serving the application may be recorded to transaction database 134. However, with failures or slowdown of patching (e.g., where machines require rebooting or restarting based on patching operations), those issues may also be stored to transaction database 134 to ensure ACID (atomicity, consistency, isolation, and durability) of transaction properties in database transactions.

Figure 4:
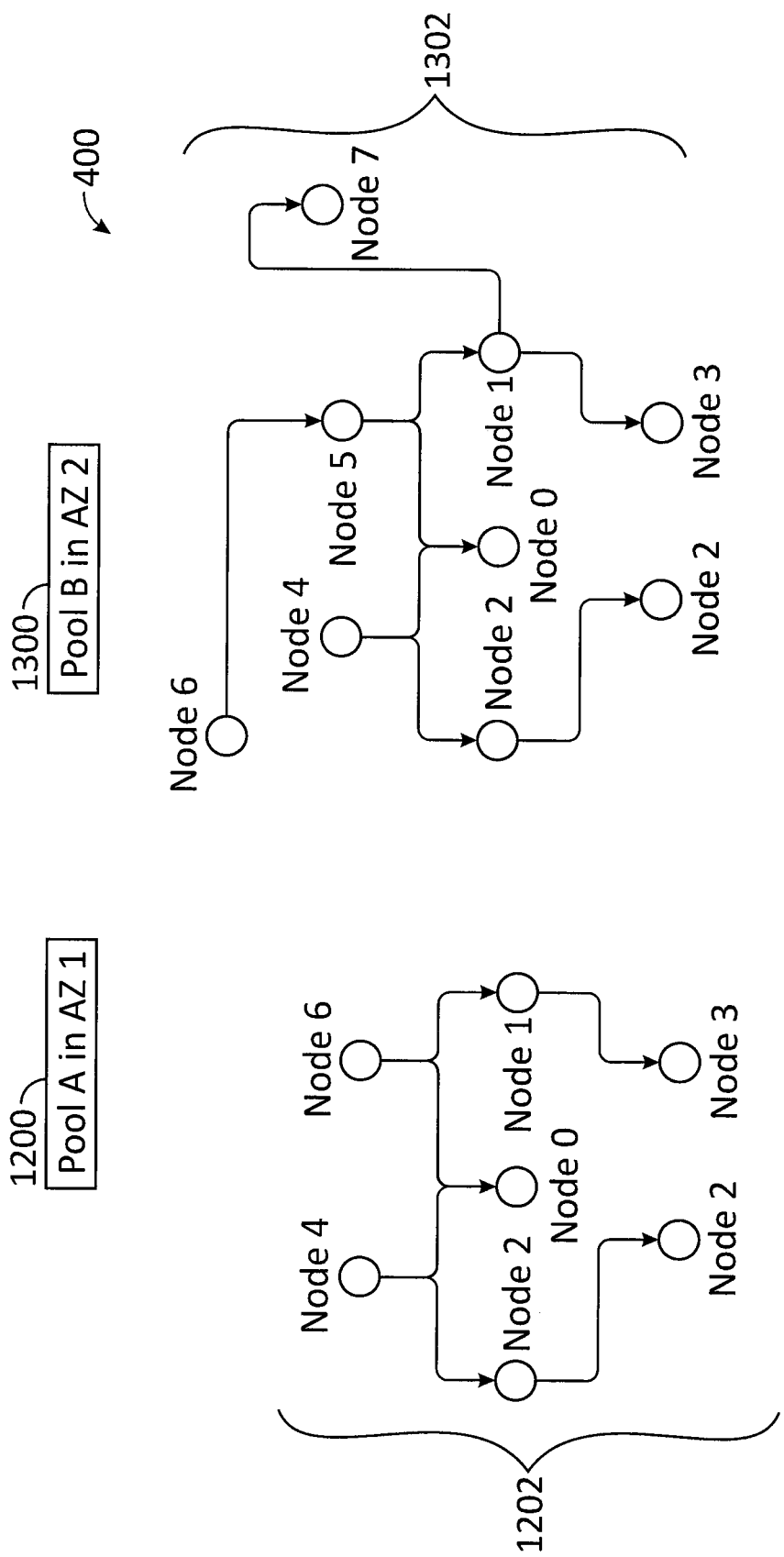
FIG. 4 is an exemplary diagram of a patch topology map for patching hosts in a cloud computing architecture, according to an embodiment.

FIG. 4 is an exemplary diagram of a patch topology map for patching hosts in a cloud computing architecture, according to an embodiment. Environment 400 includes different patching topologies that map nodes of computes or compute groups for patching based on a patching strategy generated by a patching leader operation or application for a cloud computing architecture. In this regard, the topologies may be independently processed over an availability zone for the particular topology, which may process those computes within a pool for an application of that AZ.

For example, in Pool A 1200, an AZ 1 that operates, executes, and provides an application requiring a patch may receive a corresponding topology 1202. Topology 1202 corresponds to the nodes that are processed in an order to provide patching to the computes of AZ 1 that serve the application. For Pool A 1202, the topological processing order will be Node 4 and Node 6 first, then Node 2, Node 0, and Node 1, and finally Node 2 and Node 3. Each node may correspond to one or a group of computes that may each individually be moved from the inactive portion of the processing funnel for the patching operations (e.g., based on the patching strategy) to the active funnel where patching operations are executed in an autonomous fashion on the computes within the node. For example, the patch worker operation or process may first operate on Nodes 4 and 6 to perform patching on those computes. Once the patch has been successfully implemented and performed on those computes within Nodes 4 and 6, the worker may then move to Nodes 0, 1, and 2, and subsequently to Nodes 2 and 3.

However, if Node 4 completes prior to Node 6, the worker may operate on Nodes 0 and/or 2 based on active funnel size and compute/resource availability. However, the worker may wait to advance to Nodes 0 and/or 1 until completion of patching on Node 6. In a similar manner, another worker operation or application may process topology 1302 on the computes for an application in Pool B 1300. Pool B 1300 may correspond to a different AZ 2, which may include different data centers and computes that provide an application for patching. In this regard, pool B 1300 is separate from pool A 1200, and therefore may have different parameters. For example, different computes and/or groups may be utilized or requested for the application, and different traffic, vulnerabilities, health, and usage rate or percentage may also correspond to AZ 2. When processing the computes for the nodes in AZ 2 using topology 1302, the worker may first start at Nodes 4 and 5, and proceed to Nodes 0, 1, 2, and/or 5. Thereafter, Nodes 2, 3, and/or 7 may be processed by the worker. However, specific nodes may await processing until the previous nodes are processed, patched, and released (e.g., brought back online and available as a cloud computing resource for the application).

Figure 5:
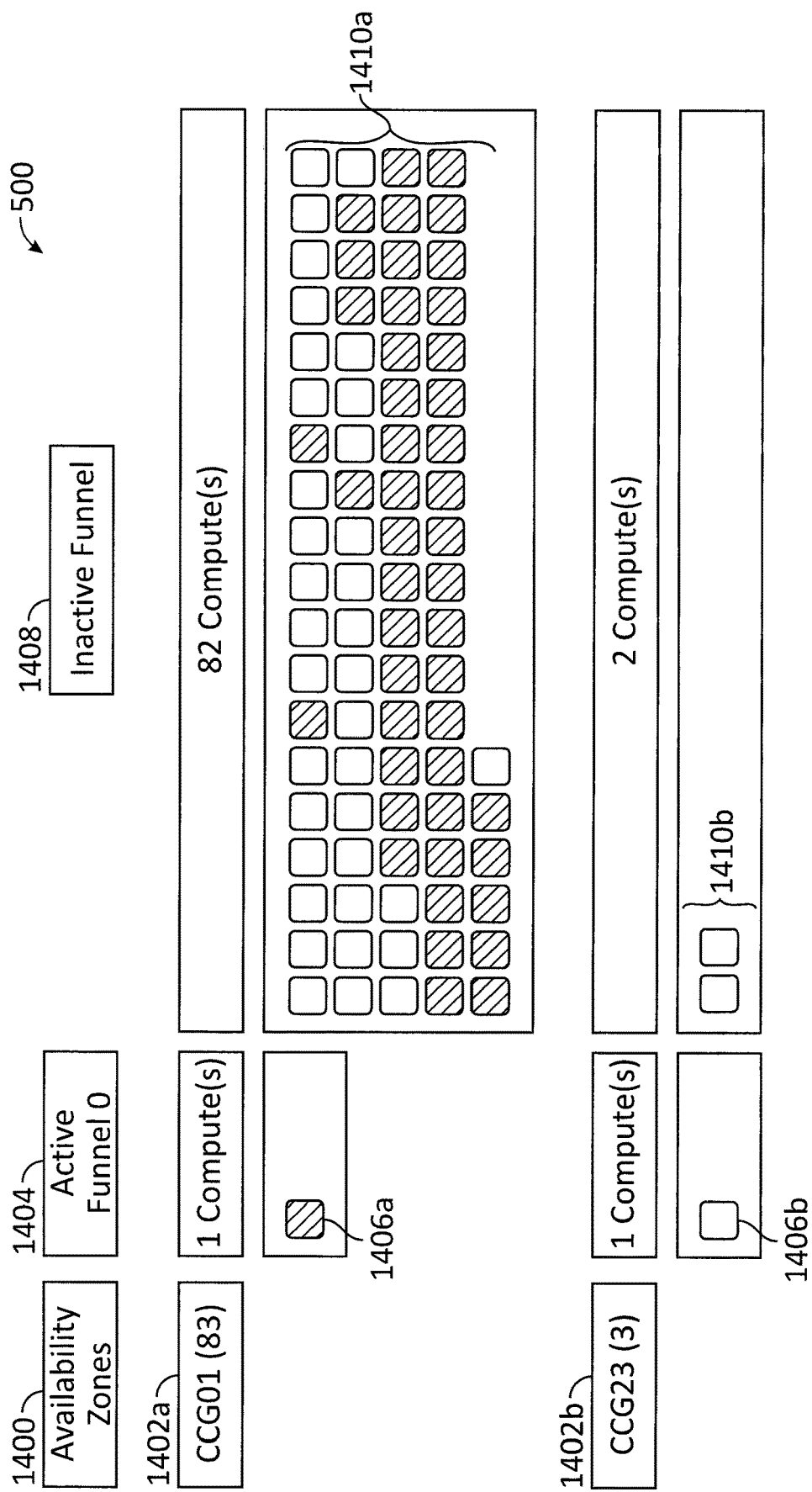
FIG. 5 is an exemplary diagram of an active and inactive funnel having computes for patching based on a patching strategy having a topology map of patching operations.

FIG. 5 is an exemplary diagram of an active and inactive funnel having computes for patching based on a patching strategy having a topology map of patching operations. Environment 500 of FIG. 5 shows a funnel system or operation that processes computes within an application-AZ pair based on a patching topology and strategy determined for the particular application and AZ. Thus, the size of the funnel partitions in environment 500 are dependent on the patching strategy of the cloud's AZ.

In this regard, environment 500 shows two different application-AZ pairs, or two different AZs that provide an application that requires patching. Thus, the AZ may include computes or other machines/hosts that may provide the application and functionalities to entities that utilize the cloud computing architecture. Availability zones 1400 are shown with having two labelled availability zones, availability zone (AZ) 1402a and availability zone (AZ) 1402b. In AZ 1402a, 83 available computes for an application are shown, while in AZ 1402b, 3 computes are to be resolved with a patch. This may be based on the maximum number of computes in AZ 1402a that provide the application and/or a subset of that, which correspond to the remaining computes requiring patching for the application. Further, environment 1404 shows an active funnel 1404 and an inactive funnel 1408.

When a worker processes a job to perform patching on an AZ, the worker may determine the computes required for the job within the AZ and may then utilize the patch strategy to determine active funnel 1404 and inactive funnel 1408. In inactive funnel 1408, the computes awaiting processing and patching reside, which the worker may draw from to place in active funnel 1404 for processing and patching. In this regard, active funnel 1404 may have a size, which may correspond to the number of computes to process and patch at a given time. This size may be based on the number of nodes in a topology map for patching, the order of the nodes, and/or the number of computes to patch at a specific node. In environment 500, the active funnel is shown as one compute for both AZ 1402a and AZ 1402b. For AZ 1402a, compute 1406a is currently being acted on by the worker and patching operation, while in AZ 1402b, compute 1406b is being operated on for the patching operations.

When active funnel 1404 completes patching of a compute for AZ 1402a and/or AZ 1402b, the worker may then utilize inactive funnel 1408 to draw one or more computes into active funnel 1404 for processing (depending on the active funnel size, such as 1 in environment 500). When drawing into active funnel 1404, the worker may analyze the compute's availability, health, vulnerability, usage and/or traffic, or other information that may be important to determine whether the topology map may advance to the next node and operate on that compute. In environment 500, computes 1410a for AZ 1402a reside in inactive funnel 1408, shown as 82 remaining computes. Similarly, for AZ 1402b, 2 remaining computes 1410b are in inactive funnel 1408. These computes may, in some embodiments, include those computes awaiting patching, those that have already been patched (and completed with work being satisfactorily done based on a fingerprint and/or patch state), and/or those computes that were attempted to be patched but work was completed with errors. Thus, these computes within inactive funnel 1408 may be available based on the parameters for each compute and the AZ and whether the compute may be next operated on from the topology.

Figure 6:
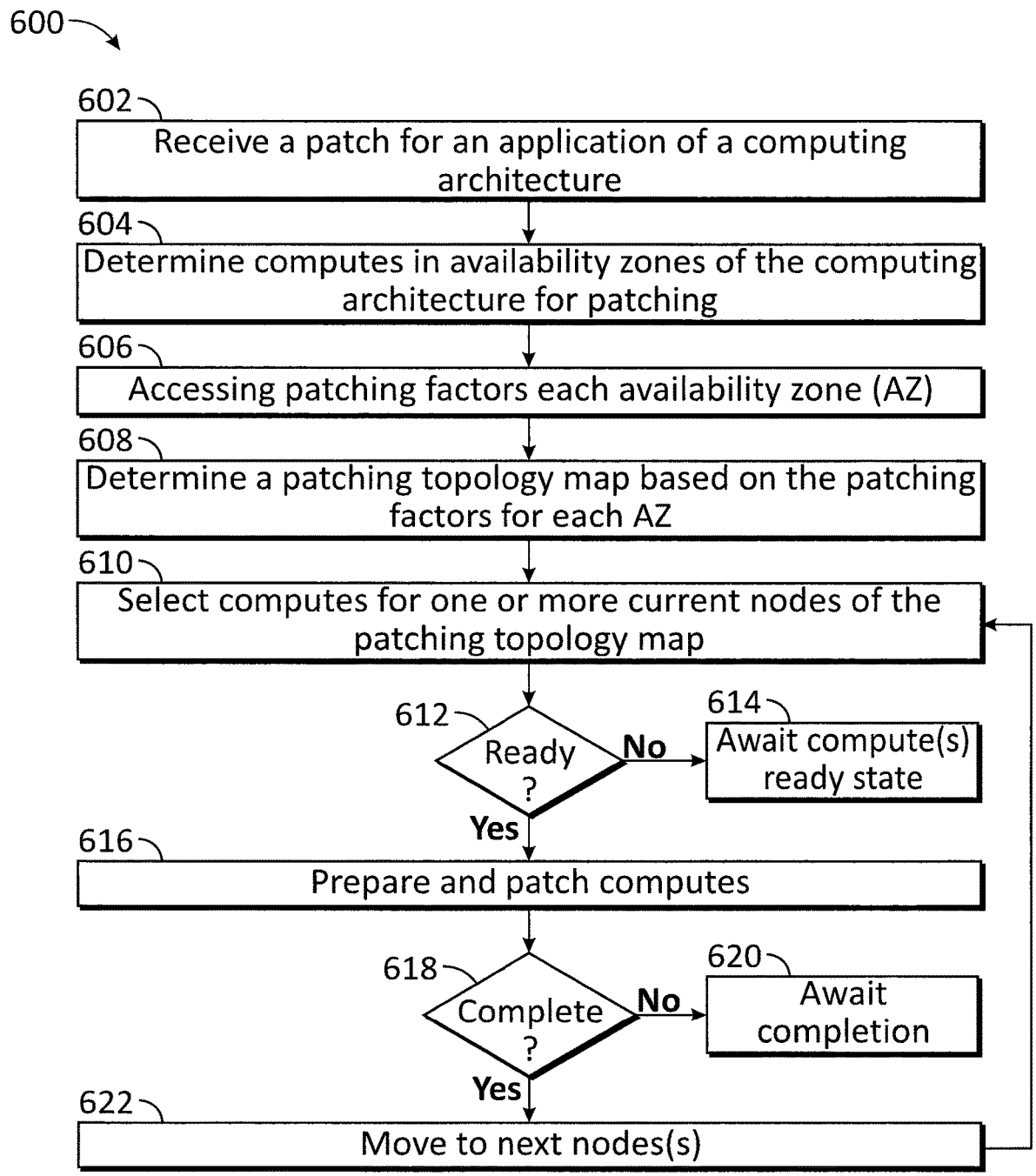
FIG. 6 is a flowchart of an exemplary process for a distributed autonomous patching system, according to an embodiment.

FIG. 6 is a flowchart 600 of an exemplary process for a distributed autonomous patching system, according to an embodiment. Note that one or more steps, processes, and methods described herein of flowchart 600 may be omitted, performed in a different sequence, or combined as desired or appropriate.

At step 602 of flowchart 600, a patch for an application of a computing architecture is received. The patch may correspond to an application patch utilized to fix or prevent a security breach, exploitation, or other vulnerability in an application that is utilized and/or provided by a cloud computing architecture having one or more data centers providing availability zones of host machines that serve entities requiring use of the cloud. In this regard, the patch may also be received with patching parameters for patching of the application throughout the cloud, including security and/or safety issues for computes of the cloud and/or availability zones, patch urgency and/or aggressiveness, or other input by an administrator or operator of the patch. Once the patch is received, computes in availability zones of the computing architecture are determined, at step 604. These computes may correspond to those available infrastructure and/or resources that can be constructed and/or provided to handle compute-intensive applications, such as those applications that require large amounts of computing power to be able to provide services and applications. For example, a compute may correspond to applications and workloads that require computational power and resources to provide cloud computing services to users. Thus, the computes may correspond to the host machines of an AZ that are available to provide the application that requires patching.

At step 606, patching factors are accessed for each availability zone, for example, by a patching leader operation. The patching factors may include input for the patching execution, including the requested patch execution safety and/or aggressiveness. This may include the patch set, such as the patch definition and the target kernel state. Additionally, the patching factors may include AZ parameters used for determining a patching strategy and AZ/compute information used for workload distribution and patch execution. For example, the patching factors may include a host or application health, traffic health of the AZ and/or compute, and/or a vulnerability of the host. In order to perform workload distribution, the patching factors may include application grouping (e.g., compute grouping), AZs and AZ factors or parameters, availability of a compute to service traffic, and the computes' transaction count per second that they are serving. Patching factors may be universal to the cloud architecture and/or may be specific to certain AZs based on those AZs and computes.

Once these patching factors are accessed, at step 608, a patching topology map is determined based on the patching factors by the leader. The patching topology map corresponds to a map, order, or route to take in patching the systems, host machines, and/or computes of a particular AZ, which may be based on the available computes to patch at a time (e.g., the size of the active funnel), those computes requiring patching, and/or the patching factors for which computes may be patched (e.g., based on health, traffic, vulnerability, etc.). The patching topology map may therefore include one or more nodes of computes for patching at a time, where a worker may proceed through the map in order to perform patching on computes within an AZ. Thus, at step 610, computes for one or more current nodes of the patching topology map are selected. Selection may be based on compute parameters, including availability to patch and/or urgency to patch, as well as if the previous node has completed patching or requires maintenance due to work done with errors. These computes may be taken from the inactive funnel, which may include all computes requiring patching in an AZ, and may further include all patched computes, those requiring patching, and those completed with errors.

At step 612, the worker determines whether the selected compute(s) are in a ready state and available to be patched. This may occur by determining whether the compute can be patched due to patch requirements (e.g., online/offline patching), compute traffic and/or health, and other parameters of the AZ and/or compute to be patched. If the compute is unavailable to be presently patched, then flowchart 600 proceeds to step 614 where the worker awaits readiness of the compute for patching, including taking offline, rebooting, or otherwise operating on that compute. However, if the compute is ready, flowchart 600 proceeds to step 616, where the node and corresponding compute(s) are prepared and patched. This may include operations used to patch the host machines, such as any required patch execution processing. Thereafter, at step 618, the worker determines whether patching is successfully completed, and the compute is now in a complete or ready for use state for use in the AZ. This may occur after rebooting of the compute from patching and determination of whether the compute has been properly patched and is ready to be utilized.

A fingerprint may also be generated of the compute prior to patching, where that fingerprint is then compared to an after-patching state of the compute. This allows for determination of whether the compute is ready for the AZ after patching of the compute. This fingerprint may be based on a node status, a load balance status, an application performance metric, or a host metric of each compute within the active funnel that is currently being processed. Thus, a pre-patch and a post-patch state may be fingerprinted, and the fingerprints may be compared to ensure proper patching. Where the fingerprints are the same or within an acceptable similarity range (e.g., having difference less than a required threshold), the patch may be determined to have been properly performed on the compute. However, where different, the compute may be restarted for patching, rebooted, and/or reversed or rolled-back so that patching may be re-attempted for the compute. Further an administrator may be alerted with the patching is unsuccessful. In some embodiments, certain factors of the fingerprint are required to match, such as the particular node and load balance states.

If the compute is not ready and/or re-patching may be required based on errors, flowchart 600 proceeds to step 620 where the worker awaits the compute(s) to be in the complete state before advancing through the topology map. This may include performing additional operations on the compute to complete patching. However, if the patching is successfully performed and/or completed (e.g., with errors, which may require administrator intervention), then flowchart 600 proceeds to step 622 where the worker proceeds to the next node(s) of the topology map and advances patching on the computes within the particular availability zone.

Figure 7:
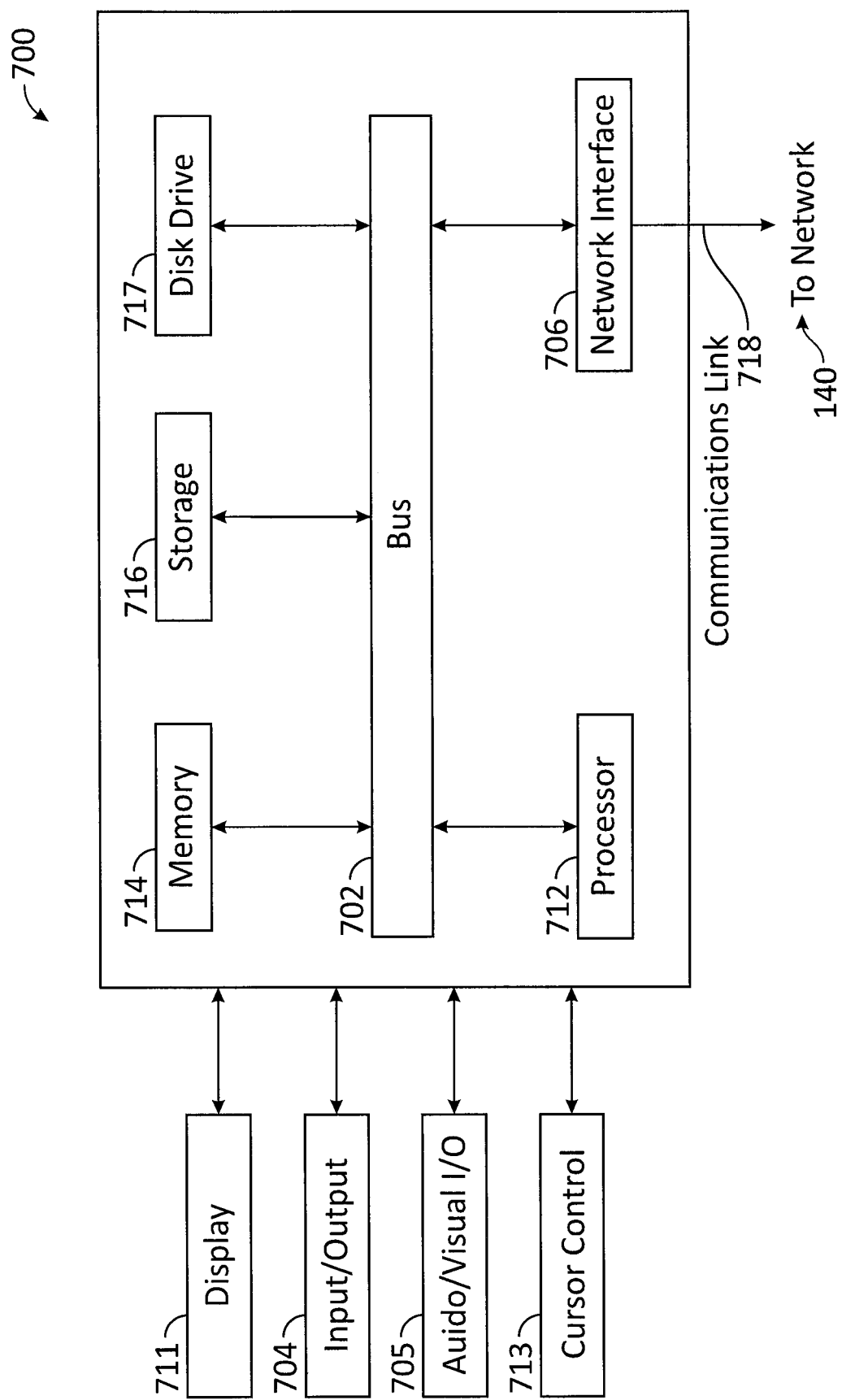
FIG. 7 is a block diagram of a computer system suitable for implementing one or more components in FIG. 1, according to an embodiment.

FIG. 7 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons, image, or links, and/or moving one or more images, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another communication device, service device, or a service provider server via network 140. In one embodiment, the transmission is wireless, although other transmission mediums and methods may also be suitable. One or more processors 712, which can be a micro-controller, digital signal processor (DSP), or other processing component, processes these various signals, such as for display on computer system 700 or transmission to other devices via a communication link 718. Processor(s) 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor(s) 712 and other components by executing one or more sequences of instructions contained in system memory component 714. Logic may be encoded in a computer readable medium, which may refer to any medium that participates in providing instructions to processor(s) 712 for execution. Such a medium may take many forms, including but not limited to, non-volatile media, volatile media, and transmission media. In various embodiments, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
    a non-transitory memory; and
    one or more hardware processors coupled to the non-transitory memory and configured to read instructions from the non-transitory memory to cause the service provider system to perform operations comprising:
        receiving a patching request for a patch of a software program utilized within a computing architecture of the service provider system;
        in response to receiving the patching request, determining a subset of machines within the computing architecture that run the software program;
        determining, based on at least two patching factors for the subset of machines, a patching topology map of the subset of machines, wherein the patching topology map comprises a first number of available machines from the subset of machines on which to perform the patch at a given time and a processing order for the subset of machines;
        selecting a first machine pool of the subset of machines based on the patching topology map;
        determining a first device fingerprint of a machine in the first machine pool based on a status of the machine and a status of a load balancer of the machine;
        performing the patch on the first machine pool; and
        determining whether a second device fingerprint of each machine in the first machine pool during the performing of the patch is associated with the first device fingerprint based on an acceptability standard.

2. The service provider system of claim 1, wherein the operations further comprise:
    determining that the patch has been successfully completed on the first machine pool; and
    selecting a second machine pool of the subset of machines based on the patching topology map and an availability metric of the subset of machines.

3. The service provider system of claim 2, wherein the operations further comprise:
    moving the second machine pool from an inactive funnel of machines in the subset of machines to an active patching operation.

4. The service provider system of claim 3, wherein the operations further comprise:
    performing the patch on the second machine pool; and
    determining whether the patch has been successfully completed on the second machine pool.

5. The service provider system of claim 2, wherein prior to selecting the second machine pool, the operations further comprise:
    monitoring the second machine pool for an availability to perform the patch; and
    determining that the second machine pool is capable of performing the patch based on the availability.

6. The service provider system of claim 1, wherein the computing architecture comprises a cloud computing architecture, wherein the subset of machines comprises one of a plurality of availability zones of the cloud computing architecture, and wherein the patching topology map is specific to the subset of machines based on the at least two patching factors.

7. The service provider system of claim 1, wherein in response to determining that the second device fingerprint is not associated with the first device fingerprint based on the acceptability standard, the operations further comprise:
    performing one of a reboot or a replace of the machine within the first machine pool.

8. The service provider system of claim 1, further comprising:
    a patching leader;
    a patching worker; and
    a messaging bus configured to communicate between the patching leader and the patching worker.

9. The service provider system of claim 1, wherein the at least two patching factors comprise an input factor based on an execution of the patch for the computing architecture and a monitored factor based on monitored data of the subset of machines, and wherein the at least two patching factors comprise at least one of required patch proliferation parameters, processing traffic, host machine health, application health, or machine vulnerability.

10. The service provider system of claim 1, wherein the first machine pool comprises a percentage of the subset of machines or a number of the subset of machines, and wherein the subset of machines comprises computes of an availability zone corresponding to a geographic location that corresponds to one of a host machine or a virtual machine.

11. A method comprising:
    determining, using a patching leader operation of a cloud computing system, a patching strategy comprising a patching order for computes of the cloud computing system and a number of the computes for updating with a software patch at each node of the patching order;
    assigning the patching strategy to at least one patching worker operation of the cloud computing system;
    determining, using the at least one patching worker operation, a first set of the computes in the cloud computing system based on the patching strategy;
    determining a first device fingerprint of a compute in the first set of the computes based on a status of the compute and a status of a load balancer of the compute;
    performing, using the at least one patching worker operation, the software patch on the first set of the computes; and
    determining whether a second device fingerprint for each compute in the first set of the computes during the performing the software patch is associated with the first device fingerprint based on an acceptability standard.

12. The method of claim 11, further comprising:
    determining, using the at least one patching worker operation, that the software patch has been completed on the first set of the computes;
    determining, using the at least one patching worker operation, a second set of the computes based on the patching strategy; and
    performing, using the at least one patching worker operation, the software patch on the second set of the computes.

13. The method of claim 12, wherein the computes comprise an availability zone of cloud computing resources for an area or a task, wherein the patching strategy comprises a patch execution funnel system for the at least one patching worker operation having an active patching funnel and an inactive patching funnel, and wherein at least one patching worker operation performs patching of the first set of the computes or the second set of the computes when assigned to the active patching funnel.

14. The method of claim 11, wherein the assigning the patching strategy is based on at least one of application grouping parameters corresponding to the first set of the computes, availability zone parameters of the first set of the computes, availability of one or more of the computes within the first set of the computes to serve traffic, and current transaction count per second served by the one of more of the computes within the first set of the computes.

15. A non-transitory computer-readable medium having stored thereon computer-readable instructions executable to cause a computer system to perform operations comprising:
receiving a patch for an application executable by machines of a computing architecture;
selecting an availability zone of the computing architecture and comprising a set of the machines;
determining, by a patch leader process, a patching topology for the availability zone based on a patching execution factor for the patch and the availability zone, wherein the patching topology comprises a hierarchy map having ordered nodes for patching the set of the machines and a number of the set of the machines within each of the ordered nodes;
issuing, by the patch leader process, the patching topology to patch execution worker process;
determining a first device fingerprint of a machine in the set of the machines based on a status of the machine and a status of a load balancer of the machine; and
during the patch of the set of machines, determining whether a second device fingerprint of each machine in the set of the machines is associated with the first device fingerprint based on an acceptability standard.

16. The non-transitory computer-readable medium of claim 15, wherein the patching execution factor comprises at least one of an input strategy for the patch, a host machine health for each of the set of the machines, an application health for the application, a traffic health for the availability zone of the computing architecture, and a vulnerability for the each of the set of the machines.

17. The non-transitory computer-readable medium of claim 15, wherein the operations further comprise:
executing the patch on a node based on the patching topology by the patch execution worker process; and
advancing the set of the machines through the ordered nodes of the patching topology at least by the patch execution worker process.

18. The non-transitory computer-readable medium of claim 15, wherein prior to determining the patching topology, the operations further comprise:
monitoring a number of active machines and a number of inactive machines of the availability zone,
wherein the determining the patching topology is further based on the monitoring.

19. The service provider system of claim 1, wherein prior to the determining the patching topology map, the operations further comprise:
determining the first number of available machines to take offline from the subset of machines based on a patch delivery speed requirement.

20. The non-transitory computer-readable medium of claim 15, wherein prior to the determining the patching topology, the operations further comprise:
determining the number of the set of the machines to take offline from the set of the machines based on a patch delivery speed requirement.

* * * * *